United States Patent

[11] 3,607,010

| [72] | Inventor | Lloyd L. Brown<br>Oak Ridge, Tenn. |
|---|---|---|
| [21] | Appl. No. | 812,515 |
| [22] | Filed | Feb. 17, 1969 |
| [45] | Patented | Sept. 21, 1971 |
| [73] | Assignee | The United States of America as represented by the United States Atomic Energy Commission<br>Continuation-in-part of 702,648, Feb. 2, 1968, now abandoned. |

[54] CHEMICAL EXCHANGE METHOD OF CONCENTRATING CARBON ISOTOPES
8 Claims, 2 Drawing Figs.

[52] U.S. Cl............................................. 23/84,
23/79, 252/301.1, 260/465.6, 264/.5
[51] Int. Cl............................................. C01c 3/08,
C07c 121/34, C09b 3/00

[50] Field of Search............................................. 23/84, 63, 64, 79, 151; 252/301.1; 264/5; 260/465.6

[56] References Cited
UNITED STATES PATENTS

| 1,680,662 | 8/1928 | Brown et al............ | 23/151 |
|---|---|---|---|
| 2,731,490 | 1/1956 | Barsky.................... | 260/465.6 |
| 3,499,727 | 3/1970 | Banfi et al................ | 23/79 |

Primary Examiner—Oscar R. Vertiz
Assistant Examiner—Hoke S. Miller
Attorney—Roland A. Anderson ABSTRACT: A method of altering the relative concentrations of carbon-12 and carbon-13 in carbon-containing compounds comprises contacting a liquid organic phase containing a cyanohydrin with an aqueous phase containing a cyanide, thereby enriching the cyanohydrin in carbon-13 and the cyanide in carbon-12.

AQUEOUS STREAM: ———
ORGANIC STREAM: - - - -

CHEMICAL EXCHANGE METHOD OF CONCENTRATING CARBON ISOTOPES

BACKGROUND OF THE INVENTION

The invention described herein was made in the course of, or under, a contract with the United States Atomic Energy Commission and is a continuation-in-part of my copending application, Ser. No. 702,648, now abandoned.

The present invention relates to chemical exchange methods of changing the concentration of carbon isotopes in carbon-containing compounds.

None of the processes currently in use for separating carbon isotopes provide a combination of a high enrichment factor with a capability for handling material at a high rate. For example, while processes using low temperature distillation of CO or thermal diffusion of $CH_4$ or CO can be made having a high production capacity, the enrichment factor is only about 1.005. On the other hand, separation by a calutron gives an enrichment factor of about 30, but the volume of material processed per unit time is necessarily low.

SUMMARY OF THE INVENTION

It is accordingly one object of my invention to provide an improved method of separating carbon isotopes.

It is another object to provide a method of separating carbon isotopes combining a high capacity with an enrichment factor which is high compared to the factors for distillation or diffusion methods.

A further object is to provide a closed end, thermal reflux system in a chemical exchange method for concentrating carbon-13.

Other objects of my invention will be apparent from the following description and the appended claims.

In accordance with my invention I have provided a method of separating carbon-12 from carbon-13 comprising contacting a liquid organic phase containing a cyanohydrin with a liquid aqueous phase containing an aqueous soluble cyanide salt, thereby enriching the cyanohydrin in carbon-13 and the cyanide in carbon-12.

The separation factor for my chemical exchange method is in the range of 1.025 to 1.040, much larger than for other processes capable of handling materials at high flow rates. Equilibrium is reached sufficiently rapidly for a continuous process, and the two components in the exchange system are readily converted into one another.

DESCRIPTION OF THE OPERATING PARAMETERS

Figure 1:
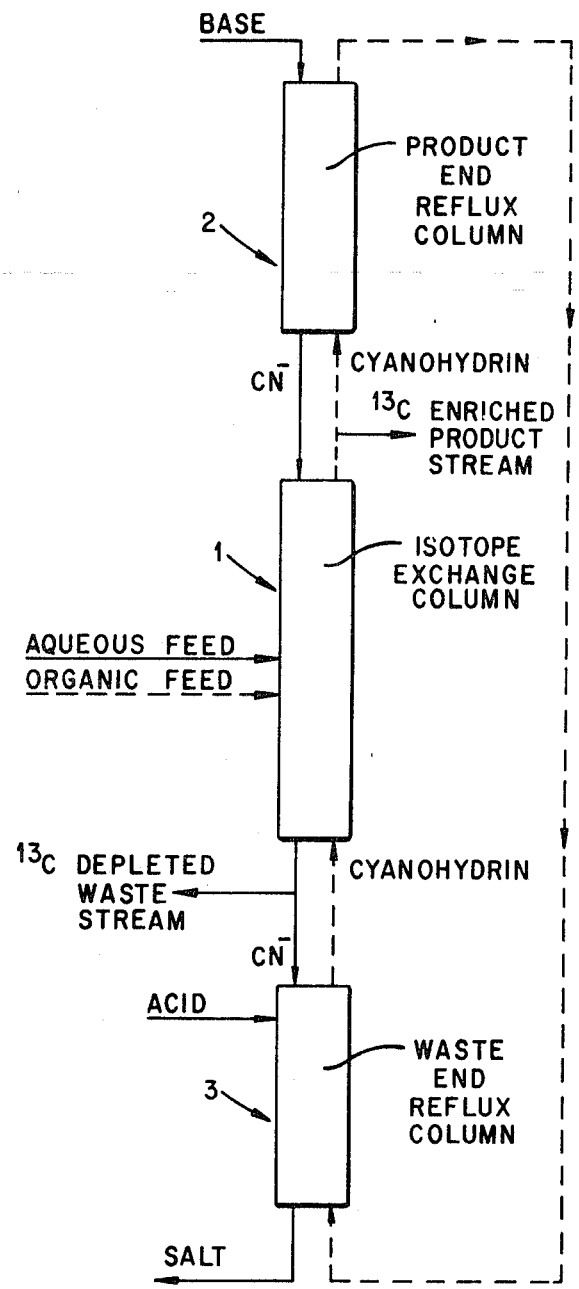
FIG. 1 is a diagrammatic representation of a system for carrying out my process. In the figure, column 1 represents an isotopic exchange column; column 2 represents a reflux column wherein a cyanohydrin is broken down into the ketone from which it was derived and a cyanide; and column 3 represents a reflux column wherein the cyanohydrin is formed.

In carrying out my invention a water-immiscible organic phase comprising a cyanohydrin is contacted with an aqueous solution of a cyanide. In this step an exchange of carbon isotopes takes place between the cyanide and the cyanohydrin which may be represented by the following equation:

(1) 

The cyanohydrin may be represented by the formula:

(2) 

$R_1$ is selected from members consisting of hydrogen, alkyl, and aryl radicals and $R_2$ is selected from alkyl and aryl radicals. While the isotopic exchange properties of the cyanohydrins do not impose any limit on the molecular weight of the ones which can be used, the physical problems arising from emulsification and solidification impose an upper molecular weight limit of about 200, and the preferred compounds are those having a molecular weight less than 150. Typical useful cyanohydrins are those derived from ketones and aldehydes, such as acetone, methyl isopropyl ketone, methyl isobutyl ketone, methyl amyl ketone, mesityl oxide, dibutyl ketone, and formaldehyde. Those cyanohydrins having a low molecular weight such as those derived from acetone must be dissolved in an immiscible organic solvent. The organic solvent must be water immiscible and be capable of dissolving the cyanohydrin. Ketones and ethers are the preferred solvents. Specific solvents which can be used are ethyl ether and methyl isobutyl ketone. The cyanohydrins having a high molecular weight do not need a separate organic solvent. The cyanohydrin derived from methyl isopropyl ketone is about the lightest compound capable of forming its own immiscible phase.

In those instances where a separate organic solvent is used, the concentration of the cyanohydrin is not critical, since carbon isotopes exchange regardless of the concentration. Concentrations of cyanohydrin in the range of 0.1 to 3 molar are suitable.

The aqueous phase is provided with cyanide in the form of any conveniently water-soluble salt. The alkali metal cyanides are readily available and are preferred for reasons of convenience.

The concentration of cyanide in the aqueous phase is not critical and may suitably be about the same as the concentration of cyanohydrin in the organic phase.

The temperature at which the exchange is carried out is not critical and excellent separation factors have been obtained at room temperature.

The two phases are separated, and the cyanide in the waste end (aqueous phase) is converted to cyanohydrin while the carbon-13 -enriched cyanohydrin in the product end (organic phase) is converted to cyanide, and returned to the isotope exchange column.

The waste end cyanide can be converted to a cyanohydrin by contacting the cyanide-containing aqueous phase with a compound more acidic than HCN and an organic solution of the aldehyde or ketone corresponding to the cyanohydrin desired. Examples of acids which may be used to effect conversion of $CN^1$ to cyanohydrin are $H_2SO_4$ and $HNO_3$. A compound more acidic than HCN is one whose Ka is greater than HCN where Ka is the acid dissociation constant. In the case where nitric acid is used, this conversion can be represented by the following equation:

(3) 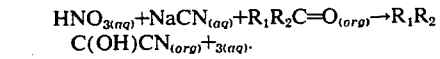

The product end carbon-13-enriched cyanohydrin in the organic phase can be converted to a cyanide by contacting the organic phase with an aqueous solution of a base; for example, sodium hydroxide or, more preferably, as will be seen, by the salt of a weak acid. The conversion of cyanohydrin with sodium hydroxide to cyanide can be represented by the following equation:

(4) 

Having described my invention, the following examples are offered to illustrate it in more detail.

EXAMPLE I

A 3-molar solution of acetone cyanohydrin in methyl isobutyl ketone was mixed with an equal volume of 3-molar sodium cyanide for 60 minutes at a temperature of 25° C. The aqueous and organic phases were then separated and the CN group in each phase was analyzed isotopically. The results showed a single-stage separation factor $$\frac{(^{13}C/^{12}C)_{org}}{(^{13}C/^{12}C)_{aq}} \text{ of } 1.036.$$

EXAMPLE II

The method of example I was carried out using ethyl ether as an organic solvent for acetone cyanohydrin. The single-stage separation factor was 1.024.

Large separation factors alone do not establish the economic feasibility of a workable plant. The rate of isotopic exchange must be rapid. The table below shows how fast exchange takes place between acetone cyanohydrin in ethyl ether and NaCN enriched in carbon-13. The two phases were preequilibrated and separated. Then the aqueous phase was spiked in $^{13}CN^1$ and aliquots recontacted to allow isotopic exchange.

TABLE

Rate of $^{13}C$ Exchange Between

Acetone Cyanohydrin and NaCN

| Time (sec.) | % $^{13}C$ in org-CN | % Exchanged |
|---|---|---|
| 0 | 1.19 | 0 |
| 10 | 1.64 | 86 |
| 20 | 1.79 | 93 |
| 40 | 1.94 | 100 |
| 100 | 1.92 | 100 |
| equil. | 1.92 | |

The calculated half-time for exchange was less than 8 seconds.

EXAMPLE III

The method of example I was carried out using methyl isobutyl ketone as an organic solvent for methyl isobutyl ketone cyanohydrin. The single-stage separation factor was 1.037. The temperature was 25° C.

PREFERRED EMBODIMENT

The widespread use of carbon-13 in chemical and biological applications is a direct function of its availability and cost. For maximum economy of operation the liquid-liquid exchange system of this invention must be capable of operation with a closed end reflux system. This means that the product end cyanohydrin must be quantitatively converted to aqueous cyanide at the waste end. It would also mean that the cyanohydrin must be quantitatively reconstituted from cyanide in the waste end reflux.

A closed end reflux system, as a preferred embodiment of this invention, is permitted by the use of a water-soluble alkali bicarbonate salt such as $NaHCO_3$, and more preferably $KHCO_3$. $KHCO_3$ is preferred because of its enhanced solubility and because of its simple chemistry in that it does not form complex salts in aqueous solution as in the case with $NaHCO_3$. It has previously been stated that the waste end cyanide can be converted to cyanohydrin by contacting the cyanide-containing aqueous phase with a compound more acidic than HCN. This would be true in the case of any protonic acid having a Ka greater than HCN. Surprisingly, however, bicarbonate behaves in the same manner although its Ka value ($4.7 \times 10^{11}$) would suggest that it is less, rather than more, acidic in comparison to HCN ($4 \times 10^{10}$).

Figure 2:
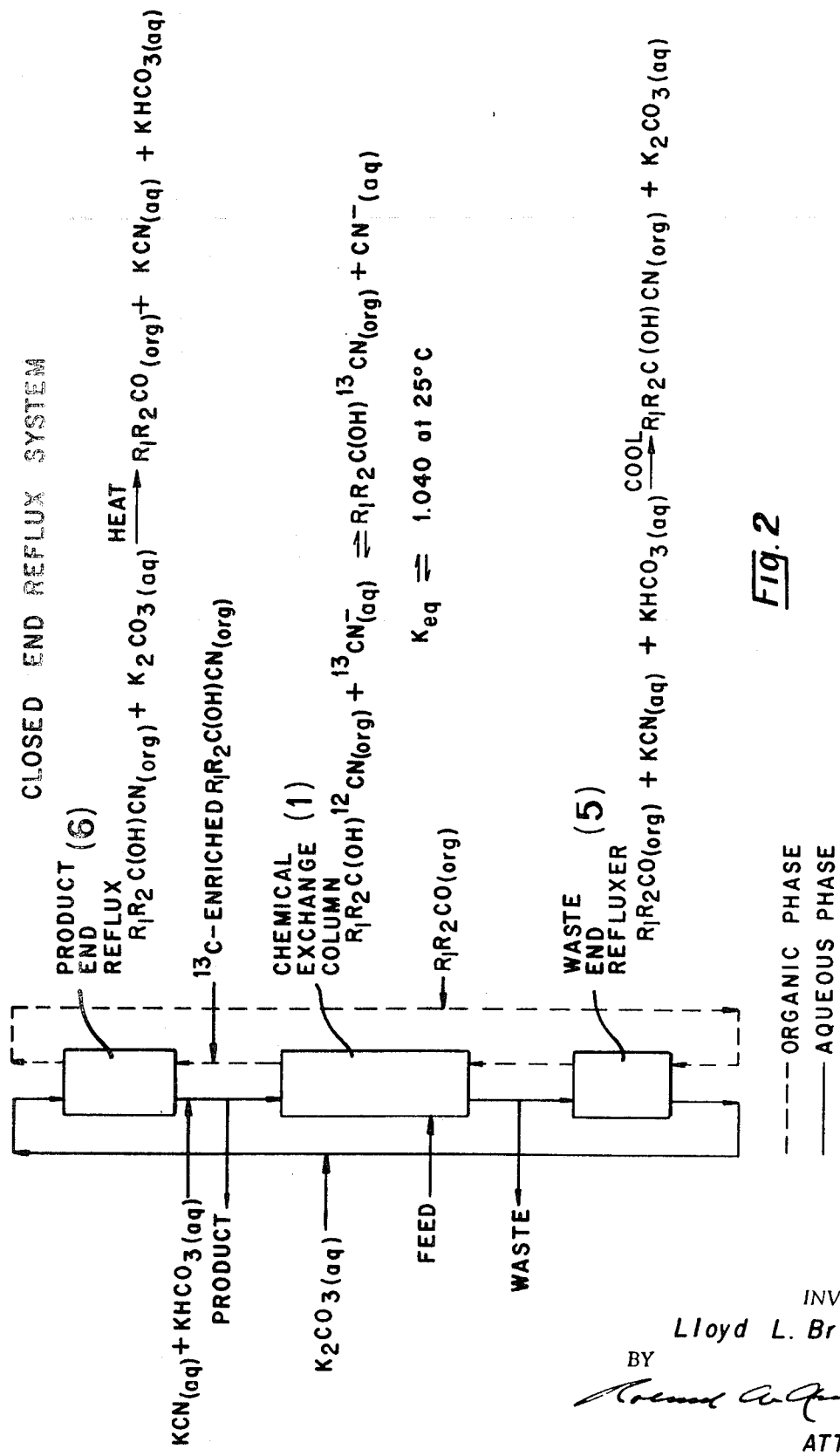
FIG. 2 is a modification of the system shown in FIG. 1, which modification permits efficient reflux of both the product and waste streams issuing from the exchange column.

The reactions and the system involved in the closed end reflux system using $KHCO_3$ are shown in FIG. 2. Reaction (5)

of FIG. 2 describes the waste end reflux in which $CN^1$ is readily extracted into the organic phase by conversion of the ketone to its corresponding organic-soluble cyanohydrin. The especial merit of $HCO_3^1$ is that it forms carbonate ion, $CO_3^=$, which can be used in the reflux reaction occurring at the product end as represented by equation (6). I have found that heated carbonate solutions will quantitatively and rapidly effect product end reflux, that is, convert cyanohydrin to ketone and cyanide. Stated another way, the heated carbonate solution will extract CN from the cyanohydrin in the organic phase into the aqueous phase. The use of heat to drive the product end reflux provides a completely closed-cycle process where no additional chemicals are required. To insure quantitative reaction at the waste end, it is preferred to operate with a stoichiometric excess of $HCO_3$ by as much as 50 percent but within the solubility limits of the bicarbonate-carbonate system. Any excess $HCO_3$ will travel to the product end reflux and then become a part of the aqueous phase in the exchange column, where its presence does not affect the isotope separation factor. The temperature of the product end reflux reaction (6) should be at least 60° C. and below the boiling point of the organic phase. Since the waste end reflux is the reverse of the product end reflux, it is aided by cooling and is preferably conducted at a temperature in the range 15° to 25° C.

The practice of the cyanide-cyanohydrin chemical exchange system in accordance with the preferred embodiment as herein disclosed will significantly reduce the cost for making large amounts of carbon-13 and thus make it practically available for chemical and biological uses on a much greater scale than heretofore possible.

I claim:

1. In a method of separating carbon-12 from carbon-13, the step of contacting a liquid organic phase comprising a cyanohydrin with a liquid aqueous phase containing a cyanide as represented by the equation:

$$R_1R_2C(OH)^{12}CN_{(org)} + b13CN^1_{(aq)} \rightarrow R_1R_2C(OH)^{13}CN_{(org)} + {}^{12}CN^1_{(aq)},$$

thereby enriching the cyanohydrin in carbon-13 and enriching the cyanide in carbon-12, where $R_1$ is selected from members consisting of hydrogen, alkyl, and aryl radicals and $R_2$ is selected from alkyl and aryl radicals.

2. The method of claim 1 wherein the molecular weight of the cyanohydrin is less than 150.

3. The method of claim 1 wherein the liquid organic phase comprises a cyanohydrin dissolved in the ketone from which it was derived.

4. The method of claim 1 wherein the liquid organic phase comprises acetone cyanohydrin dissolved in methyl isobutyl ketone.

5. The method of claim 1 wherein the liquid organic phase comprises methyl isobutyl ketone cyanohydrin dissolved in methyl isobutyl ketone.

6. In an improved method for concentrating carbon-13 in a liquid-liquid chemical exchange system, the improvement which comprises:

1. contacting a liquid organic phase comprising a cyanohydrin with a liquid aqueous phase containing a cyanide as represented by the equation:

$$R_1R_2C(OH)^{12}CN_{(org)} + b13CN^1_{(aq)} \rightarrow R_1R_2C(OH)^{13}CN_{(org)} + {}^{12}CN^1_{(aq)},$$

thereby enriching the cyanohydrin in carbon-13 and enriching the cyanide in carbon-12, wherein the cyanohydrin is represented by the formula:

$$R_2-\underset{\underset{CN}{|}}{\overset{\overset{R_1}{|}}{C}}-OH$$

where $R_1$ is selected from members consisting of hydrogen, alkyl, and aryl radicals and $R_2$ is selected from alkyl and aryl radicals;

2. effecting reflux of the carbon-13-enriched organic phase at a temperature in the range 60° C. to a temperature below the boiling point of the organic phase in accordance with the following reaction:

where X is an alkali metal; and 3. effecting reflux of the carbon-13-depleted aqueous phase at a temperature in the range 15°–25° C. in accordance with:

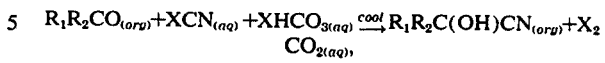

where X is an alkali metal.

7. The method according to claim 6 wherein $X$ is potassium.

8. The method according to claim 6 wherein $XHCO_3$ is present in stoichiometric excess.

UNITED STATES PATENT OFFICE
CERTIFICATE OF CORRECTION

Patent No. 3,607,010          Dated September 21, 1971

Inventor(s) Lloyd L. Brown

It is certified that error appears in the above-identified patent and that said Letters Patent are hereby corrected as shown below:

Column 1, line 68, "$^{13}CN^1_{(aq)}$" should read -- $^{13}CN^-_{(aq)}$ --; line 69, "$^{12}CN^1_{(aq)}$" should read -- $^{12}CN^-_{(aq)}$ --.

Column 2, line 1, before "$R_1$" read -- where --; line 49, "$CN^1$" should read -- $CN^-$ --; line 56, before "$_{3(aq)}$" read -- NaNO --.

Column 3, line 19, "$^{13}CN^1$" should read -- $^{13}CN^-$ --; line 71, "$10^{111}$" should read -- $10^{-11}$ --; line 72, "$10^{110}$" should read -- $10^{-10}$ --.

Column 4, line 1, "$CN^1$" should read -- $CN^-$ --; line 4, "$HCO_3^1$" should read -- $HCO_3^-$ --; lines 39 and 65, "$b13CN^1_{(aq)}$" should read -- $13CN^-_{(aq)}$ --; lines 40 and 66, "$CN^1_{(aq)}$" should read -- $CN^-_{(aq)}$ --.

Column 6, line 6, "$CO_{2(aq)}$" should read -- $CO_{3(aq)}$ --.

Signed and sealed this 13th day of June 1972.

(SEAL)
Attest:

EDWARD M. FLETCHER, JR.          ROBERT GOTTSCHALK
Attesting Officer                  Commissioner of Patents